United States Patent
Ding et al.

(10) Patent No.: US 10,569,471 B2
(45) Date of Patent: Feb. 25, 2020

(54) THREE-DIMENSIONAL OBJECT FORMING DEVICE AND METHOD THEREOF

(71) Applicants: XYZprinting, Inc., New Taipei (TW); Kinpo Electronics, Inc., New Taipei (TW)

(72) Inventors: Ming-Hsiung Ding, New Taipei (TW); Tsung-Hua Kuo, New Taipei (TW); Wei-Chun Jau, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 233 days.

(21) Appl. No.: 15/669,981

(22) Filed: Aug. 7, 2017

(65) Prior Publication Data
US 2018/0361669 A1    Dec. 20, 2018

(30) Foreign Application Priority Data
Jun. 20, 2017   (CN) ........................ 2017 1 0468577

(51) Int. Cl.
*B29C 64/393* (2017.01)
*B29C 64/264* (2017.01)
(Continued)

(52) U.S. Cl.
CPC .......... *B29C 64/393* (2017.08); *B29C 64/124* (2017.08); *B29C 64/135* (2017.08);
(Continued)

(58) Field of Classification Search
CPC ... B29C 64/393; B29C 64/264; B29C 64/124; B29C 64/245; B29C 64/255; B33Y 30/00; B33Y 50/02; B33Y 10/00
See application file for complete search history.

(56) References Cited

U.S. PATENT DOCUMENTS

| 6,538,255 B1 * | 3/2003 | Nakasuji ................ B82Y 10/00 |
| | | 250/397 |
| 2007/0161049 A1 * | 7/2007 | Picollet-D'Hahan ........................ |
| | | G01N 33/48728 |
| | | 435/7.2 |

(Continued)

FOREIGN PATENT DOCUMENTS

| JP | H06155588 | 6/1994 |
| WO | 9600422 | 1/1996 |

OTHER PUBLICATIONS

"Search Report of Europe Counterpart Application", dated Apr. 26, 2018, p. 1-p. 6.

(Continued)

*Primary Examiner* — Nahida Sultana
(74) *Attorney, Agent, or Firm* — JCIPRNET

(57) ABSTRACT

A 3D object forming device and a method thereof are provided. The device includes a tank used for containing a liquid forming material. A light source irradiates the liquid forming material to cure a 3D object layer-by-layer on a moving platform. In the irradiation process, when a target position currently irradiated by the light source is located on a first layer next to the moving platform, the light source is maintained to an original intensity; when the target position is not located on the first layer next to the moving platform, and when it is determined that a non-cured hollow layer exists in a predetermined number of layers at one side of the target position opposite to the light source according to the slicing data, the intensity of the light source is correspondingly decreased according to the number of layers between the hollow layer and the target position.

10 Claims, 4 Drawing Sheets

(51) Int. Cl.
  *B33Y 10/00*      (2015.01)
  *B33Y 30/00*      (2015.01)
  *B33Y 50/02*      (2015.01)
  *B29C 64/245*     (2017.01)
  *B29C 64/255*     (2017.01)
  *B29C 64/124*     (2017.01)
  *B29C 64/135*     (2017.01)

(52) U.S. Cl.
  CPC .......... *B29C 64/245* (2017.08); *B29C 64/255* (2017.08); *B29C 64/264* (2017.08); *B33Y 10/00* (2014.12); *B33Y 30/00* (2014.12); *B33Y 50/02* (2014.12)

(56)     References Cited

U.S. PATENT DOCUMENTS

| | | |
|---|---|---|
| 2016/0221267 A1 | 8/2016 | John et al. |
| 2017/0102679 A1 | 4/2017 | Greene et al. |
| 2019/0039287 A1* | 2/2019 | Amaya ................ B29C 64/153 |
| 2019/0039314 A1* | 2/2019 | Amaya ................ B29C 64/393 |
| 2019/0047228 A1* | 2/2019 | Brown ................ B29C 64/153 |

OTHER PUBLICATIONS

"Office Action of Japan Counterpart Application," dated Dec. 10, 2019, pp. 1-4.

\* cited by examiner

THREE-DIMENSIONAL OBJECT FORMING DEVICE AND METHOD THEREOF

CROSS-REFERENCE TO RELATED APPLICATION

This application claims the priority benefit of China application serial no. 201710468577.9, filed on Jun. 20, 2017. The entirety of the above-mentioned patent application is hereby incorporated by reference herein and made a part of this specification.

BACKGROUND OF THE INVENTION

Field of the Invention

The invention relates to a three-dimensional (3D) printing mechanism, and particularly relates to a 3D object forming device and a method thereof.

Description of Related Art

In recent years, along with rapid development of technology, different methods for constructing three-dimensional (3D) models by using additive manufacturing technology such as layer-by-layer model constructing, etc. have been developed. Generally, the additive manufacturing technology is to convert design data of a 3D model constructed by software of computer aided design (CAD), etc. into a plurality of continuously stacked thin (quasi two-dimensional (2D)) cross-section layers. Meanwhile, a plurality of technical means for forming a plurality of the thin cross-section layer is gradually provided. For example, a printing module of a printing apparatus generally moves above a printing platform along an XY plane according to spatial coordinates XYZ constructed by the design data of the 3D model, such that a constructing material may form a correct shape of the cross-section layer. Then, by moving the printing module layer-by-layer along a Z-axis, a plurality of the cross-section layers are gradually stacked along the Z-axis, such that the constructing material fouls a 3D object under a layer-by-layer curing condition.

Taking a technique of using a light source curing construction material to construct a 3D object as an example, the printing module is adapted to be immerged into a liquid forming material contained in a tank, and a light source irradiates the liquid forming material serving as the constructing material on the XY plane, such that the liquid forming material is cured and stacked on a moving platform. In this way, as the moving platform of the printing module moves along the Z-axis layer-by-layer, the liquid forming material may be cured layer-by-layer and stacked to form the 3D object.

However, since a light-curing material is used as the liquid forming material, light may penetrate through the cured layers, and the cured layers may have unexpected curing due to penetration of light. FIG. 1 is a schematic diagram of a 3D object obtained by using a present 3D object forming device. Since photosensitive resin is light transmitting, an unexpected cured layer is formed under irradiation of a light D. As shown by the 3D object 110 of FIG. 1, when a cured layer 112 is formed, the light D may penetrate through a cured layer 111 to produce an unexpected cured layer 121 on the top of the cured layer 111. When a cured layer 113 is formed, the light D may penetrate through the cured layer 112 to produce an unexpected cured layer 122 on the top of the cured layer 112.

SUMMARY OF THE INVENTION

The invention is directed to a 3D object forming device and a method thereof, which are adapted to resolve the problem of unexpected curing caused by light penetration.

The invention provides a 3D object forming device including a tank, a moving platform, a light source and a controller. The tank is used for containing a liquid forming material. The moving platform is movably disposed above the tank. The light source is disposed under the tank for irradiating the liquid forming material, such that a 3D object is cured layer-by-layer on the moving platform. The controller is coupled to the light source and the moving platform, and controls the moving platform to move, and controls an intensity of the light source according to slicing data of a digital 3D model. When a target position currently irradiated by the light source is located on a first layer next to the moving platform, the controller maintains the light source to an original intensity. When the target position is not located on the first layer next to the moving platform, and when it is determined that a non-cured hollow layer exists in a predetermined number of layers at one side of the target position opposite to the light source according to the slicing data, the controller correspondingly decreases the intensity of the light source according to the number of layers between the hollow layer and the target position.

In an embodiment of the invention, the further the hollow layer is close to the target position, the larger the intensity of the light source is decreased.

In an embodiment of the invention, the predetermined number of layers is three. If the hollow layer is next to the target position, the controller sets the light source to a first intensity. If the hollow layer and the target position are spaced by a layer of cured layer, the controller sets the light source to a second intensity. If the hollow layer and the target position are spaced by two layers of the cured layer, the controller sets the light source to a third intensity. The first intensity is smaller than the second intensity, the second intensity is smaller than the third intensity, and the third intensity is smaller than the original intensity.

In an embodiment of the invention, the first intensity is 30% of the original intensity, the second intensity is 50% of the original intensity, and the third intensity is 70% of the original intensity.

In an embodiment of the invention, the liquid forming material is a photosensitive resin, and the light source is ultraviolet light.

The invention provides a method for forming a 3D object, which is adapted to a 3D object forming device. The 3D object forming device includes a tank used for containing a liquid forming material, the method for forming the 3D object includes following steps. A light source is used to irradiate the liquid forming material in the tank, and a 3D object is cured layer-by-layer on a moving platform. During a process of using the light source to irradiate, when a target position currently irradiated by the light source is located on a first layer next to the moving platform, the light source is maintained to an original intensity. When the target position is not located on the first layer next to the moving platform, it is determined whether a non-cured hollow layer exists in a predetermined number of layers at one side of the target position opposite to the light source based on slicing data of a digital 3D model, and in case that the hollow layer exists in the predetermined number of layers, an intensity of the light source is correspondingly decreased according to the number of layers between the hollow layer and the target position.

According to the above description, the intensity of the light source is decreased based on the position of the non-cured hollow layer, so as to prevent the unexpected curing caused by penetration of light.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention. Moreover, in the following embodiments, the same or similar components are denoted by the same or similar referential numbers.

Figure 1:
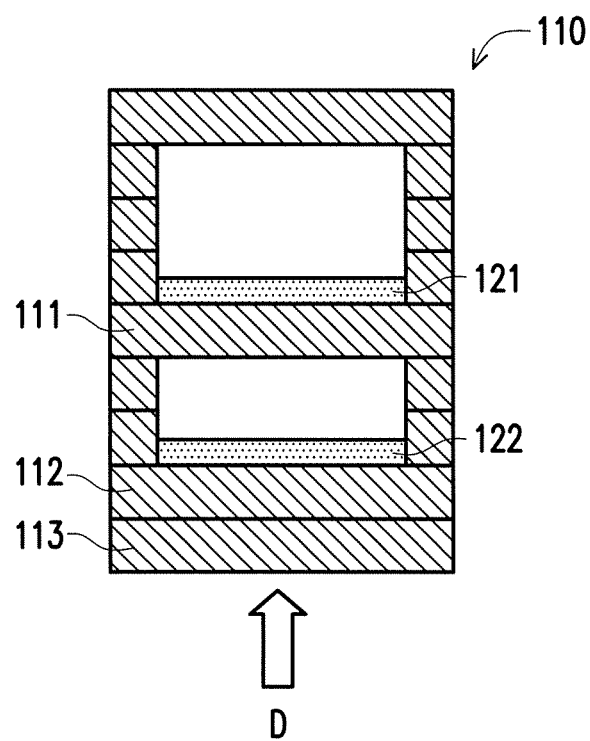
FIG. 1 is a schematic diagram of a 3D object obtained by using a present 3D object forming device.
Figure 2A:
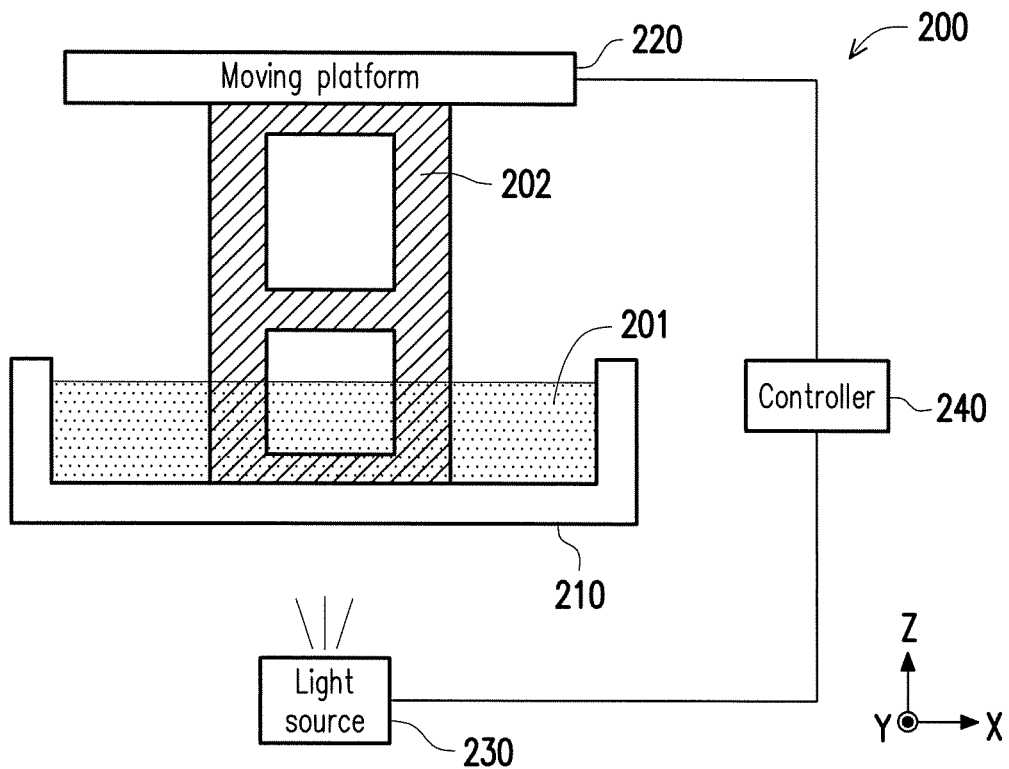
FIG. 2A and FIG. 2B are schematic diagrams of a three-dimensional (3D) object forming device.
Figure 2B:
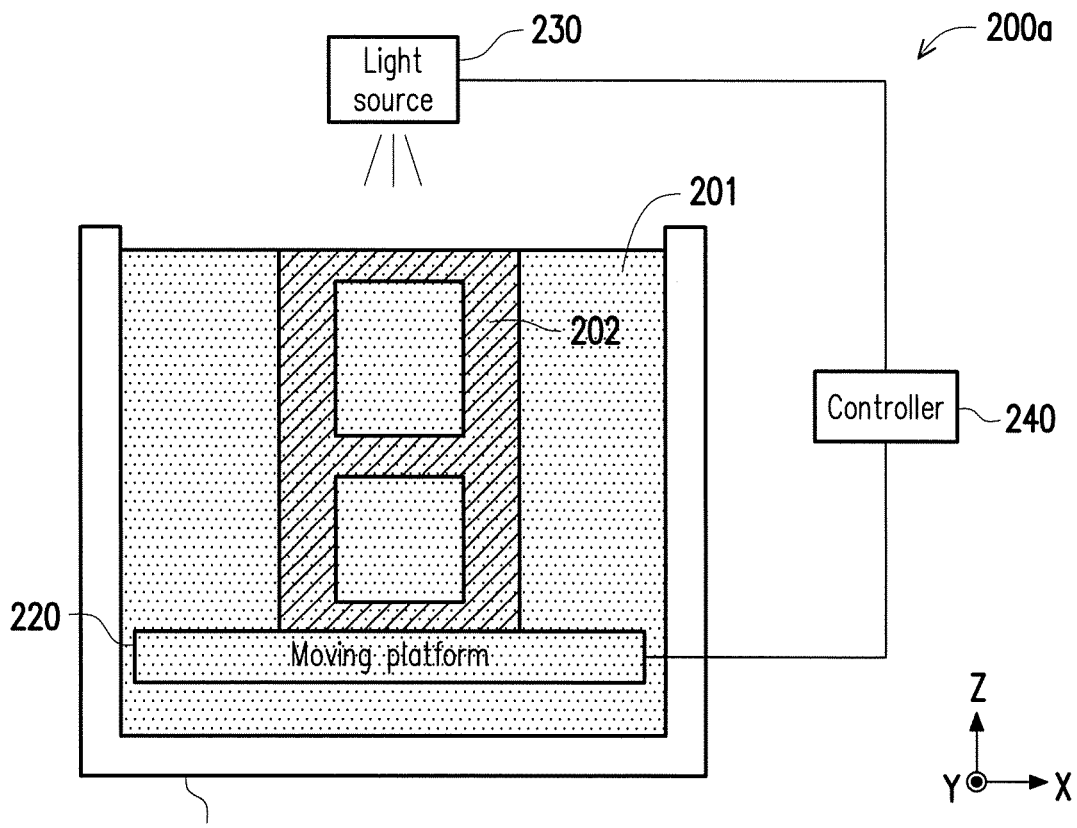

FIG. 2A and FIG. 2B are schematic diagrams of a three-dimensional (3D) object forming device. FIG. 2A illustrates a bottom irradiation type 3D object forming device 200, and FIG. 2B illustrates a top irradiation type 3D object forming device 200a.

Referring to FIG. 2A, the 3D object forming device 200 includes a tank 210, a moving platform 220, a light source 230 and a controller 240. The tank 210 is used for containing a liquid forming material 201. The moving platform 220 is movably disposed above the tank 210. The light source 230 is disposed under the tank 210 for irradiating the liquid forming material 201, such that a 3D object 202 is cured layer-by-layer on the moving platform 220. The controller 240 is coupled to the light source 230 and the moving platform 220, and controls the moving platform 220 to move, and controls an intensity of the light source 230 according to slicing data of a digital 3D model. The liquid forming material 201 of the present embodiment adopts a photosensitive resin or other applicable light curing material, and the light forming material 201 is cured after being irradiated by the light source 230.

The controller 240 is, for example, a central processing unit (CPU), or other programmable general purpose or special purpose microprocessor, a digital signal processor (DSP), a programmable controller, an application specific integrated circuits (ASIC), a programmable logic device (PLD) or other similar device or a combination of the above devices, which is not limited by the invention.

The 3D object forming device 200 produces the 3D object 202 according to the digital 3D model. Namely, the 3D object forming device 200 may read the digital 3D model to produce the 3D object 202 layer-by-layer according to cross-sections of the digital 3D model. The 3D object 202 is obtained by using the light source 230 to irradiate the liquid forming material 201 and cure the same layer-by-layer. The digital 3D model is, for example, generated through compilation and calculation of computer-aided design (CAD) or animation modelling software, and the 3D object forming device 200 may read the digital 3D model to execute a forming procedure of the 3D object. In detail, the digital 3D model includes a plurality of slicing data of sliced objects of a plurality of cross-sections obtained by performing a slicing processing to the digital 3D object. The controller 240 may control to produce the sliced objects layer-by-layer according to the slicing data of the digital 3D model, and stack the same to form the 3D object 202.

In FIG. 2A, the moving platform 220 is located above the tank 210, and is adapted to move relative to the tank 210 along an axial direction. The moving platform 220 can be moved out of the tank 210 or moved into the tank 210 to immerge into the liquid forming material 201. As shown in FIG. 2A, the moving platform 220 is moved along a Z-axis to move relative to the tank 210 located on an XY plane, and is immerged into the liquid forming material 201 contained in the tank 210. The controller 240 controls the moving platform 220 immerged in the liquid forming material 201 to move along the Z-axis to depart from the light source 230 (i.e. to move upwards), so as to cure the liquid forming material 201 layer-by-layer, and form the 3D object 202 on the moving platform 220 through a layer-by-layer stacking manner.

Referring to FIG. 2B, the 3D object forming device 200a also includes the tank 210, the moving platform 220, the light source 230 and the controller 240. In the embodiment of the top irradiation type, the light source 230 is disposed above the tank 210 to irradiate the liquid forming material 201, such that the 3D object 202 is cured layer-by-layer on the moving platform 220. Moreover, the tank 210 has a depth that is enough for forming the 3D object 202 therein. The moving platform 220 can be immerged in the liquid forming material 201.

In FIG. 2B, the moving platform 220 is moved along the Z-axis to move relative to the tank 210 located on the XY plane, and is immerged in the liquid forming material 201 contained in the tank 210. The controller 240 controls the moving platform 220 immerged in the liquid forming material 201 to move along the Z-axis to depart from the light source 230 (i.e. to move downwards), so as to cure the liquid forming material 201 layer-by-layer, and form the 3D object 202 on the moving platform 220 through the layer-by-layer stacking manner.

Figure 3:
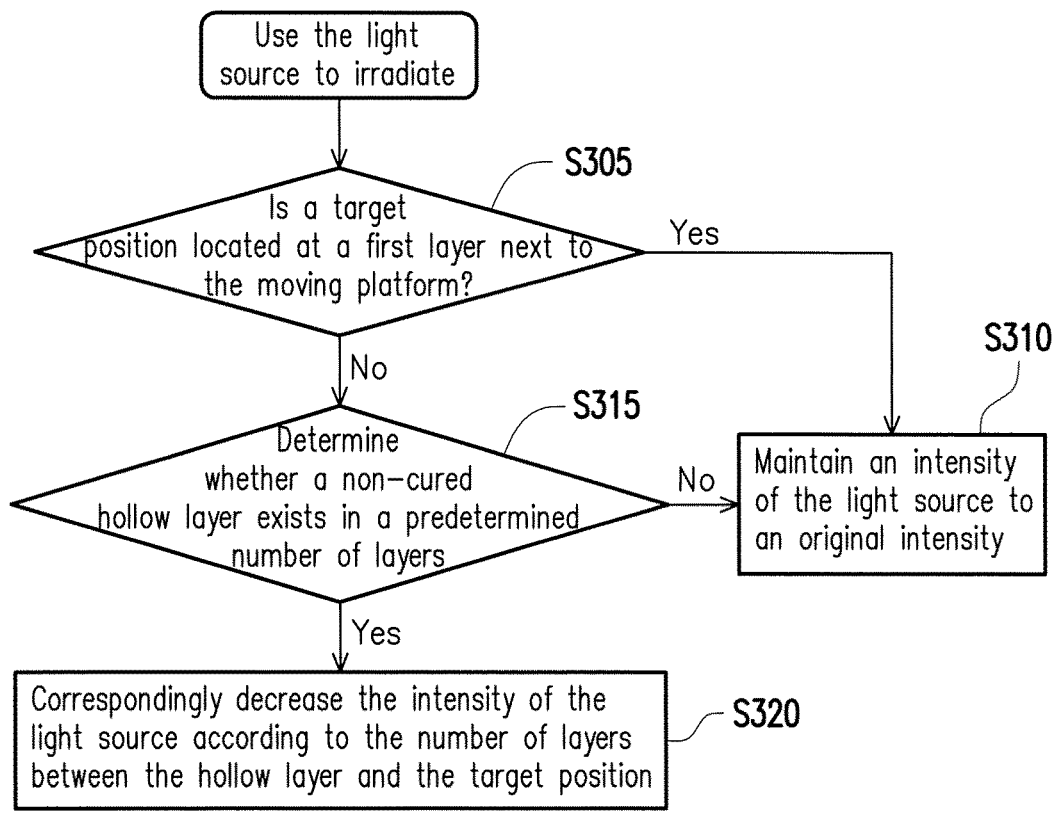
FIG. 3 is a flowchart illustrating a method for forming a 3D object according to an embodiment of the invention.

FIG. 3 is a flowchart illustrating a method for forming a 3D object according to an embodiment of the invention. In the present embodiment, the light source 230 irradiates the liquid forming material 201 in the tank 210, such that the 3D object 202 is cured layer-by-layer on the moving platform 220. During the process of using the light source 230 to irradiate, as shown in FIG. 3, in step S305, it is determined whether a target position currently irradiated by the light source is located on a first layer next to the moving platform 220. Herein, the controller 240 may determine whether the currently forming layer is the first layer on the moving platform 220 based on the slicing data of the digital 3D model.

If the target position is located on the first layer next to the moving platform 220, in step S310, the controller 240 maintains the intensity of the light source 230 to an original intensity. For example, the controller 240 may control the light source 230 to irradiate by using 100% intensity.

If the target position is not located on the first layer next to the moving platform 220, in step S315, it is determined whether a non-cured hollow layer exists in a predetermined number of layers. Namely, the controller 240 determines whether the non-cured hollow layer exists in the predetermined number of layers at one side of the target position opposite to the light source 230 based on the slicing data of the digital 3D model. For example, the slicing data may record curing data representing whether each voxel in each slicing layer is required to be cured. For example, "1" represents curing, and "0" represents not to cure. According to the curing data of each slicing layer, it is determined whether the non-cured hollow layer exists in the predetermined number of layers on one side (opposite to the side disposing the light source 230) at a position which is the same as the target position in the XY plane.

If the hollow layer exists in the predetermined number of layers, in step S320, the controller 240 correspondingly decreases the intensity of the light source 230 according to the number of layers between the hollow layer and the target position. The further the hollow layer is close to the target position, the larger the intensity of the light source 230 is decreased. If the hollow layer does not exist in the predetermined number of layers, in step S310, the controller 240 may maintain the intensity of the light source 230 to the original intensity. Moreover, a magnitude of intensity reduction of the light source 230 can be determined according to transparency of the cured liquid forming material 201.

This is because that if the hollow layer exists in the predetermined number of layers, the light emitted by the light source 230 may penetrate the cured layer to form unexpected curing in the hollow layer. Therefore, in case that the hollow layer exists in the predetermined number of layers, the intensity of the light source 230 is properly decreased to decrease a curing density of the layer. When the light irradiates a next layer, the light emitted by the light source 230 may continually cure the previous layer of cured layer when penetrating through the previous layer of cured layer without causing the unexpected curing in the hollow layer.

It is assumed that the predetermined number of layers is 3, if the hollow layer is next to the target position, the light source 230 is set to a first intensity; if the hollow layer and the target position are spaced by one layer of cured layer, the light source 230 is set to a second intensity; if the hollow layer and the target position are spaced by two layers of the cured layer, the light source 230 is set to a third intensity. The first intensity is smaller than the second intensity, the second intensity is smaller than the third intensity, and the third intensity is smaller than the original intensity.

Figure 4:
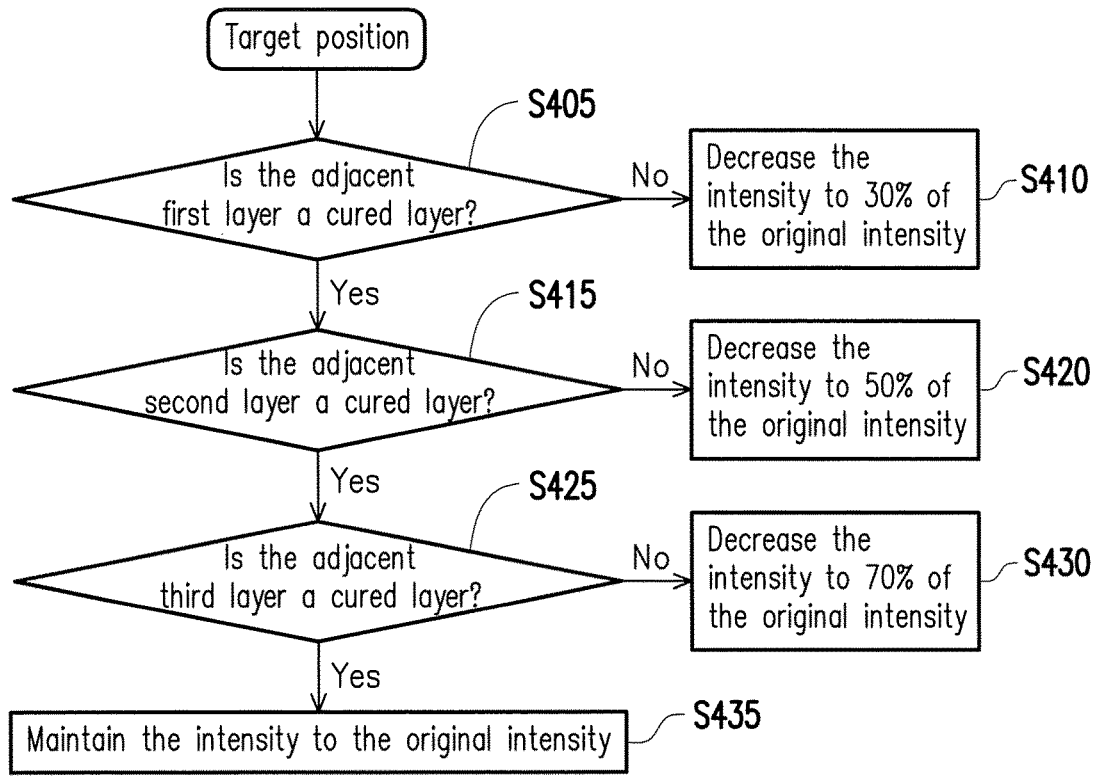
FIG. 4 is a flowchart illustrating a method for adjusting an intensity of a light source according to an embodiment of the invention.

Various steps of adjusting the intensity of the light source are described below. FIG. 4 is a flowchart illustrating a method for adjusting an intensity of the light source according to an embodiment of the invention. Referring to FIG. 4, in step S405, the controller 240 determines whether the first layer (adjacent to the layer where the target position is located) next to a position which is the same as the target position on the XY plane is cured based on slicing data. If the first layer is the non-cured hollow layer, i.e. the hollow layer is next to the target position, in step S410, the controller 240 decreases the intensity of the light source 230 to 30% of the original intensity.

If the first layer is cured, in step S415, the controller 240 determines whether a second layer (adjacent to the first layer) next to a position which is the same as the target position on the XY plane is cured based on slicing data. If the second layer is the non-cured hollow layer, i.e. the hollow layer and the target position are spaced by one layer of cured layer, in step S420, the controller 240 decreases the intensity of the light source 230 to 50% of the original intensity.

If the first layer and the second layer are all cured, in step S425, the controller 240 determines whether a third layer (adjacent to the second layer) next to a position which is the same as the target position on the XY plane is cured based on slicing data. If the third layer is the non-cured hollow layer, i.e. the hollow layer and the target position are spaced by two layers of cured layer, in step S430, the controller 240 decreases the intensity of the light source 230 to 70% of the original intensity. If the first to the third layers are all cured, in step S435, the controller 240 maintains the light source 230 to 100% of the original intensity. The predetermined number of layers of 3 and the intensity decreasing rates of 30%, 50%, 70% are all an example, and the invention is not limited thereto.

Figure 5:
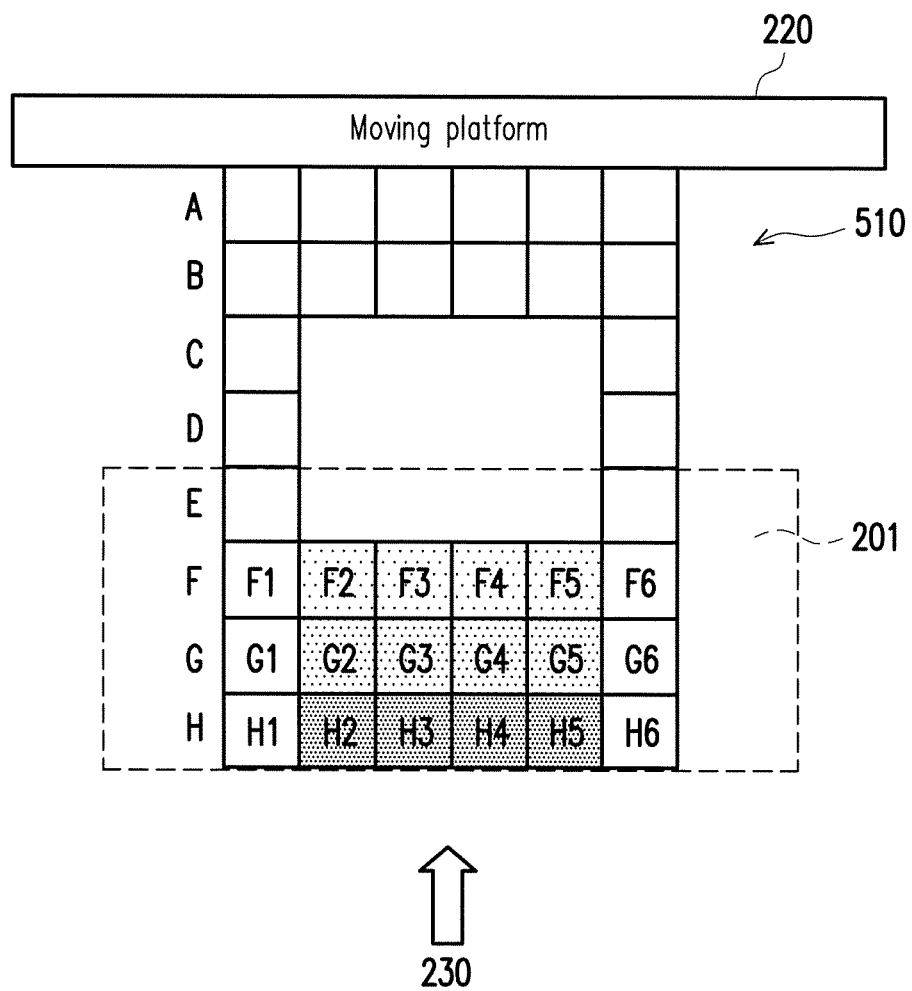
FIG. 5 is a schematic diagram of a 3D object according to an embodiment of the invention.

FIG. 5 is a schematic diagram of a 3D object according to an embodiment of the invention. In the present embodiment, by using the light source 230 to irradiate and cure the liquid forming material 201, a slicing layer A to a slicing layer H are cured layer-by-layer on the moving platform 220 to obtain the 3D object 510.

Referring to FIG. 5, the slicing layer A of the 3D object 510 is the first layer next to the moving platform 220, so that when the light source 230 irradiates each position in the slicing layer A, the light source 230 irradiates in 100% of the original intensity. Each position of the slicing layer B does not have a hollow layer in the aforementioned predetermined number of layers (for example, 3), so that when each position of the slicing layer A is irradiated, the light source 230 still irradiates in 100% of the original intensity.

In the slicing layer F, the positions (which are the same as the positions F1 and F6) of three layers (i.e. the slicing layers E, D, C) next to the positions F1 and F6 are all cured, so that the light source 230 still irradiates in 100% of the original intensity. When the light source 230 respectively irradiates the positions F2-F5, since the positions which are the same as positions F1-F5 in the slicing layer E are hollow, the intensity of the light source 230 is decreased to 30% of the original intensity for irradiation.

In the slicing layer G, the positions (which are the same as the positions G1 and G6) of three layers (i.e. the slicing layers F, E, D) next to the positions G1 and G6 are all cured, so that the light source 230 still irradiates in 100% of the original intensity. When the light source 230 respectively irradiates the positions G2-G5, since the slicing layer F next to the positions G2-G5 is a cured layer, and the positions which are the same as positions G2-G5 in the layer E (separated from the positions G2-G5 by two layers) are hollow, the intensity of the light source 230 is decreased to 50% of the original intensity for irradiation.

In the slicing layer H, the positions (which are the same as the positions H1 and H6) of three layers (i.e. the slicing layers G, F, E) next to the positions H1 and H6 are all cured, so that the light source 230 still irradiates in 100% of the original intensity. When the light source 230 respectively irradiates the positions H2-H5, since the positions (which are the same as positions H2-H5) of the first layer and the second layer (the slicing layers G and F) next to the positions H2-H5 are all cured layers, and the positions (which are the same as positions H2-H5) of the third layer (the slicing layer E) are hollow, the intensity of the light source 230 is decreased to 70% of the original intensity for irradiation. Deduced by analogy, the 3D object 510 complied with the digital 3D model can be obtained.

Regarding the position H2, when the light source 230 irradiates in 70% of the original intensity, when the light penetrates through the position G2 and the position F2, since the position G2 and the position F2 have lower curing density during the curing process, the penetration light may increase the curing density of the position G2 and the position F2, so that the penetration light does not cause unexpected curing on the hollow layer. Therefore, the position irradiated by the light with decreased intensity can be irradiated by the subsequent penetration light to increase the curing density thereof. For example, the position F2 can be compensated by the lights penetrating through the positions G2, H2 to achieve the curing density of 100%.

In the embodiment of FIG. 5, although the bottom irradiation type 3D object forming device 200 is taken as an example for description, the same method is also adapted to the top irradiation type 3D object forming device 200a.

In summary, the intensity of the light source is decreased based on the positions of the non-cured hollow layer, so as to decrease the curing density of the currently irradiated target position, such that the subsequently penetrated lights may continually strengthen the curing density of the target position, so as to prevent the unexpected curing caused by penetration of light.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional object forming device, comprising:
   a tank, configured to contain a liquid forming material;
   a moving platform, movably disposed above the tank;
   a light source, disposed under the tank for irradiating the liquid forming material, such that a three-dimensional object is cured layer-by-layer on the moving platform;
   a controller, coupled to the light source and the moving platform, controlling the moving platform to move, and controlling an intensity of the light source according to slicing data of a digital three-dimensional model,
   wherein when a target position currently irradiated by the light source is located on a first layer next to the moving platform, the controller maintains the light source to an original intensity,
   when the target position is not located on the first layer next to the moving platform, and when it is determined that a non-cured hollow layer exists in a predetermined number of layers at one side of the target position opposite to the light source according to the slicing data, the controller correspondingly decreases the intensity of the light source according to the number of layers between the hollow layer and the target position.

2. The three-dimensional object forming device as claimed in claim 1, wherein the further the hollow layer is close to the target position, the larger the intensity of the light source is decreased.

3. The three-dimensional object forming device as claimed in claim 1, wherein the predetermined number of layers is three,
   if the hollow layer is next to the target position, the controller sets the light source to a first intensity;
   if the hollow layer and the target position are spaced by a layer of cured layer, the controller sets the light source to a second intensity; and
   if the hollow layer and the target position are spaced by two layers of the cured layer, the controller sets the light source to a third intensity,
   wherein the first intensity is smaller than the second intensity, the second intensity is smaller than the third intensity, and the third intensity is smaller than the original intensity.

4. The three-dimensional object forming device as claimed in claim 3, wherein the first intensity is 30% of the original intensity, the second intensity is 50% of the original intensity, and the third intensity is 70% of the original intensity.

5. The three-dimensional object forming device as claimed in claim 1, wherein the liquid forming material is a photosensitive resin, and the light source is ultraviolet light.

6. A method for forming a three-dimensional object, adapted to a three-dimensional object forming device, wherein the three-dimensional object forming device comprises a tank used for containing a liquid forming material, the method for forming the three-dimensional object comprising:
   using a light source to irradiate the liquid forming material in the tank, such that a three-dimensional object is cured layer-by-layer on a moving platform, wherein a process of using the light source to irradiate comprises:
      maintaining the light source to an original intensity when a target position currently irradiated by the light source is located on a first layer next to the moving platform;
      determining whether a non-cured hollow layer exists in a predetermined number of layers at one side of the target position opposite to the light source based on slicing data of a digital three-dimensional model when the target position is not located on the first layer next to the moving platform; and
      correspondingly decreasing an intensity of the light source according to the number of layers between the hollow layer and the target position in case that the hollow layer exists in the predetermined number of layers.

7. The method for forming the three-dimensional object as claimed in claim 6, wherein the further the hollow layer is close to the target position, the larger the intensity of the light source is decreased.

8. The method for forming the three-dimensional object as claimed in claim 6, wherein the predetermined number of layers is three, and a step of correspondingly decreasing the intensity of the light source according to the number of layers between the hollow layer and the target position in case that the hollow layer exists in the predetermined number of layers comprises:
   setting the light source to a first intensity if the hollow layer is next to the target position;
   setting the light source to a second intensity if the hollow layer and the target position are spaced by a layer of cured layer; and
   setting the light source to a third intensity if the hollow layer and the target position are spaced by two layers of the cured layer, wherein the first intensity is smaller than the second intensity, the second intensity is smaller than the third intensity, and the third intensity is smaller than the original intensity.

9. The method for forming the three-dimensional object as claimed in claim 8, wherein the first intensity is 30% of the original intensity, the second intensity is 50% of the original intensity, and the third intensity is 70% of the original intensity.

10. The method for forming the three-dimensional object as claimed in claim 6, wherein the liquid forming material is a photosensitive resin, and the light source is ultraviolet light.

* * * * *